US006043487A

United States Patent [19]

Waki

[11] Patent Number: 6,043,487

[45] Date of Patent: Mar. 28, 2000

[54] ELECTROSPRAY IONIZER

[75] Inventor: Hiroaki Waki, Kyoto, Japan

[73] Assignee: Shimadzu Corporation, Kyoto, Japan

[21] Appl. No.: 09/019,581

[22] Filed: Feb. 6, 1998

[30] Foreign Application Priority Data

Feb. 20, 1997 [JP] Japan .................................... 9-053853

[51] Int. Cl.[7] ............................ B01D 59/44; H01J 49/00

[52] U.S. Cl. ............................................ 250/288; 250/281

[58] Field of Search .................................... 250/281, 288, 250/288 A

[56] References Cited

U.S. PATENT DOCUMENTS

| | | | |
|---|---|---|---|
| 4,885,076 | 12/1989 | Smith et al. . | |
| 5,162,651 | 11/1992 | Wang et al. | 250/288 |
| 5,597,467 | 1/1997 | Zhu et al. | 250/288 |
| 5,725,153 | 3/1998 | Wang et al. | 239/102.1 |
| 5,848,751 | 12/1998 | Wang et al. | 239/420 |

FOREIGN PATENT DOCUMENTS 0 362 813 4/1990 European Pat. Off. .

OTHER PUBLICATIONS

Yin–Liang Hsieh et al: "Detection of Noncovalent FKBP–FK506 and FKBP–Rapamycin Complexes Bycapillary Electrophoresis–Mass Spectrometry and Capillary Electrophoresis–Tandem Mass Spectrometry" Journal of the American Society for Mass Spectrometry, vol. 6, No. 2, Feb. 1, 1995, pp. 85–90.

Creaser C. S. et al: "A Versartile Particle 1–5 Beam Interface for Coupling HPLC to Ion Trap Quadrupole and Sector Mass Spectrometers" Instrumentation Science & Technology, vol. 22, No. 2, May 1, 1994, pp. 185–198.

*Primary Examiner*—Bruce C. Anderson

*Attorney, Agent, or Firm*—Armstrong, Westerman, Hattori, McLeland & Naughton

[57] ABSTRACT

An electrospray ionizer which enables the operator to adjust the position of the glass capillary with respect to the metal tube to which a high voltage is applied while the sample solution is being nebulized and ionized at the fore end of the glass capillary. The electrospray ionizer is composed of: a glass capillary for allowing the sample solution to flow out from its fore end; a metal tube surrounding the fore end part of the glass capillary for generating an irregular electric field at around the fore end of the glass capillary; a first pipe, or a guide pipe, made of a non-conductive material for holding the back end of the metal tube and extending backward; a second pipe, or a seal pipe, for loosely holding the glass capillary further back along the first pipe; and a joint for connecting the first pipe and the second pipe. Consequently, the position of the glass capillary is loosely fixed with respect to the metal tube. Thus by manipulating the back end of the glass capillary to slide the glass capillary in the second pipe, it is possible to change the position, or the length of the extension d, of the fore end of the glass capillary with respect to the metal tube. This enables the operator to adjust the extension d so that the amount of ions generated at the fore end of the glass capillary is at its maximum while the electrospray ionizer is working and the metal tube has a high voltage applied to it, whereby the sensitivity of the liquid chromatograph using the electrospray ionizer of the present invention is greatly improved.

9 Claims, 2 Drawing Sheets

ELECTROSPRAY IONIZER

The present invention relates to an electrospray ionizer which is used, for example, as an interface between the liquid chromatographic (LC) section and the mass spectrometric (MS) section of an LC/MS analyzer.

BACKGROUND OF THE INVENTION

A conventional LC/MS is shown in FIG. 2. Components of liquid sample are separated in the column 21 of the LC section 20 and are successively introduced into the interface section 30, where the liquid components are nebulized by spraying and ionized. The ions pass through the desolvation heated pipe 32 placed between the interface section 30 and the mass spectrometric section 40, and are converged and accelerated by the ion lens 41 toward the quadrupole filter 42. In the quadrupole filter 42, ions having a preset mass number (the ratio of mass to charge m/z) can pass through the quadrupole filter 42 and are detected by the detector 43.

In the interface section 30, the liquid component is nebulized and ionized by heating, by high-speed air flow, by high-voltage electric field, etc. An electrospray ionization (ESI) method and an atmospheric chemical ionization (APCI) method are two most prevalent methods of ionization. In the ESI method, a high voltage is applied to the nozzle 31, where the sample solution is separated by electrical charges owing to the high voltage. The sample solution is drawn into droplets (nebulized) by means of the Coulomb attraction and the droplets divide up successively by means of the Coulomb repulsion until they are ionized. In the APCI method, the sample solution is nebulized by heating at the nozzle 31, and the droplets of the sample solution chemically react with ions of a carrier gas (buffer ions) produced by a corona discharge, whereby ions of the sample solution are produced.

FIG. 3 shows the spraying section (the nozzle 31 of FIG. 2) of a conventional electrospray ionizer. A glass capillary 11, which is connected to the outlet of the column 21 of the LC section 20, is inserted into a narrow metal tube 12, and the fore end of the glass capillary 11 extends out of the metal tube 12. The metal tube 12 is held in a nebulizing tube 13 with a certain gap, where a nebulizing gas, such as nitrogen gas, is supplied from the back end (the end toward the column) into the cap. The nebulizing gas blows out from around the fore end of the metal tube 12.

When a high voltage of several kilovolts is applied by the high voltage generator 14 to the metal tube 12, the sample solution in the glass capillary 11 is electrically charged and is sprayed out from the end of the glass capillary 11 into tiny droplets with the aid of the nebulizing gas. The solvent in the electrically charged droplets evaporates while the droplets contact with the ambient gas, whereby the ions of the sample are produced. Though the spraying and ionization of the sample solution can occur owing to the Coulomb force alone without using the nebulizing gas, the nebulizing gas helps to promote a stable production of a large amount of ions.

When the number of ions produced in an electrospray ionizer is to be increased, several conditions should be appropriately adjusted to produce finer droplets, among which the voltage applied to the metal tube 12 is included. In the electrospray ionizer of the above structure, the strength of the electric field at the discharge end (fore end) of the glass capillary 11 depends largely on the length of the extension d of the glass capillary 11 from the metal tube 12. It is therefore important to adjust the extension d to such length at which the number of ions produced reaches a maximum.

When, however, ions are being produced, or when the sample solution is being nebulized, the high voltage is applied to the metal tube 12, so that the operator cannot touch it. Conventionally, therefore, the extension length d is determined appropriately beforehand, and then ionization is performed. This inevitably leads to a poor adjustment or a longer adjusting time.

SUMMARY OF THE INVENTION

Thus, one of the objects of the present invention is to enable the operator to adjust the electrospray ionizer to its optimal conditions while producing ions.

According to the present invention, an electrospray ionizer for ionizing a sample solution comprises:

- a glass capillary for allowing the sample solution to flow out from the fore end of the glass capillary;
- a metal tube provided surrounding the fore end of the glass capillary for generating an electric field, actually an irregular electric field, at around the fore end of the glass capillary;
- a first pipe made of a non-conductive material for holding the back end of the metal tube and extending backward;
- a second pipe for loosely holding the glass capillary further back along the first pipe; and
- a joint for connecting the first pipe and the second pipe.

By the configuration, the glass capillary is held (though loosely) at around its back end by the second pipe, and the metal tube is held at its back end by the first pipe. Since the first pipe and the second pipe are connected by the joint, consequently, the position of the glass capillary is loosely fixed with respect to the metal tube. Thus by manipulating the back end of the glass capillary to slide the glass capillary in the second pipe, it is possible to change the position, or the length of the extension d, of the fore end of the glass capillary with respect to the metal tube. This enables the operator to adjust the extension d so that the amount of ions generated at the fore end of the glass capillary is at its maximum while the electrospray ionizer is working and a high voltage is applied to the metal tube, whereby the sensitivity of the liquid chromatograph using the electrospray ionizer of the present invention is greatly improved. The manipulating operation of the glass capillary at the back end is quite safe because the first pipe is made of non-conductive material and the location of manipulation on the glass capillary is remote from the fore end where a high voltage is applied to the metal tube.

In the above configuration, a fastener may be provided at the second pipe and the joint for making the second pipe hold the glass capillary tightly after the position of the glass capillary with respect to the metal tube is adjusted and determined as described above. Similar fastening may be provided at the first pipe and the metal tube to securely fix the first pipe and the metal tube. This secures the above positioning of the glass capillary and fixation of the extension d.

BRIEF DESCRIPTION OF THE DRAWINGS

The invention may be best understood by referring to the following description of the preferred embodiment and the drawings in which.

DETAILED DESCRIPTION OF A PREFERRED EMBODIMENT

Figure 1:
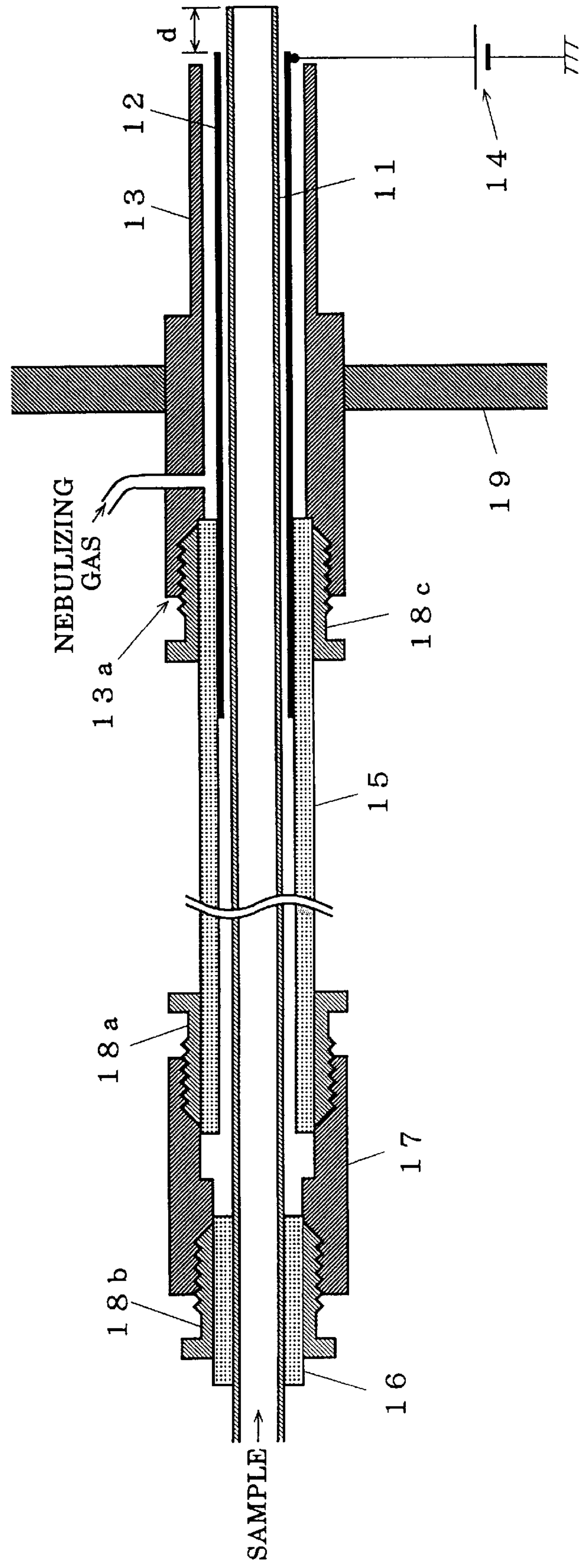
FIG. 1 is a cross-sectional view of an electrospray ionizer as an embodiment of the present invention.
Figure 2:
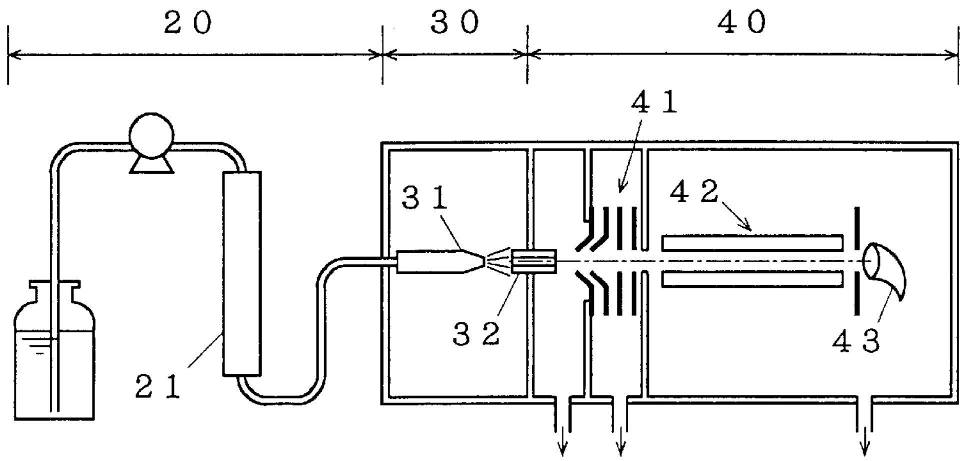
FIG. 2 is a cross-sectional diagram of a liquid chromatograph mass spectrometer (LC/MS)
Figure 3:
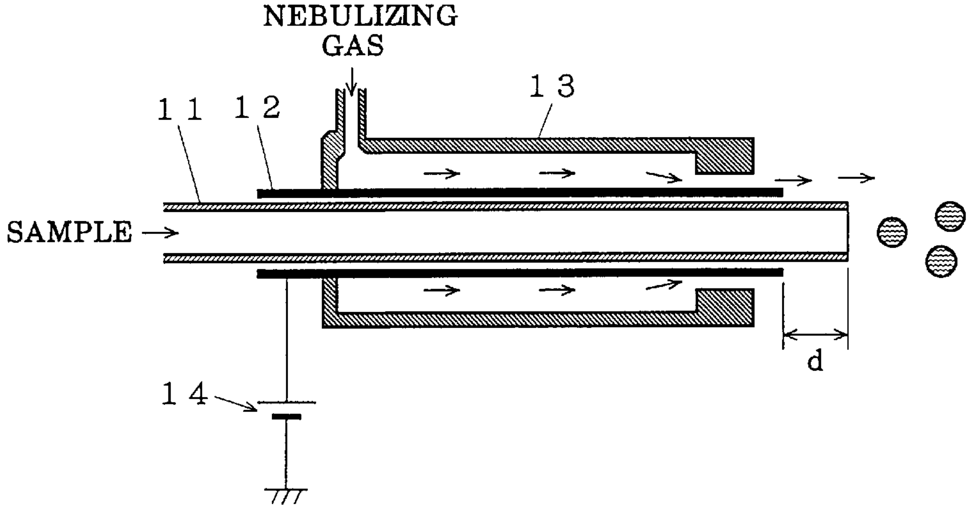
Fig. 3 PRIOR ART
FIG. 3 is a cross-sectional view of a conventional electrospray ionizer.

FIG. 1 shows an electrospray ionizer embodying the present invention. A glass capillary 11 is connected to the exit of a column of a liquid chromatograph (not shown), and a part of the glass capillary 11 at the fore end (discharge end) is surrounded by a metal tube 12 and then by a nebulizing tube 13. The nebulizing tube 13 is fixed by a fixing member 19 to, for example, the nebulizing chamber.

The back end of the metal tube 12 is tightly inserted in a guide pipe 15, which extends backward therefrom. The guide pipe 15 should be non-conductive. Plastics such as teflon (trademark) or rubber may be used for the guide pipe 15.

The back end of the guide pipe 15 is inserted into an end of a joint 17, and the other end of the joint 17 holds a seal pipe 16. The inner diameter of the seal pipe 16 is substantially the same as the outer diameter of the glass capillary 11. The seal pipe 16 is made of non-conductive material, and is adequately smooth, in order to facilitate free sliding of the glass tube. The material of the seal pipe 16 may be the same as that of the guide pipe 15. On the inner wall of both ends of the joint 17 are formed threads, to which fastening rings 18*a* and 18*b* are screwed to fasten the joint 17/guide pipe 15 and the joint 17/seal pipe 16. Another fastening ring 18*c* is provided to fasten the guide pipe 15 and the back end 13*a* of the nebulizing tube 13. The threaded part of the fastening rings 18*a*–18*c* may be divided by generatrix slits to secure tight fastening.

When a high voltage of, for example, several kilovolts is applied from the high voltage generator 14 to the metal tube 12, an irregular electric field occurs at the fore end of the glass capillary 11, whereby the sample solution coming out of the glass capillary 11 is electrically separated. If, for example, a positive high voltage is applied to the metal tube 12, positive ions gather at the surface of the sample solution at the fore end of the glass capillary 11 while negative ions recede back toward the metal tube 12. The solution at the fore end of the glass capillary 11 is thus charged positive owing to the excessive positive ions, and is drawn out of the glass capillary 11 due to a negative voltage applied to a desolvation pipe (a heating pipe) or to an ion lens (both not shown). When a nebulizing gas is supplied to the nebulizing tube 13, the sample solution is further nebulized by the nebulizing gas blowing out of the nebulizing tube 13.

By screwing the fastening ring 18*c* on the guide pipe 15 into the nebulizing tube 13, the guide pipe 15 is further fastened onto the metal tube 12 so that the position of the guide pipe 15 and the metal tube 12 is temporarily fixed to the nebulizing tube 13. Similarly by screwing the fastening ring 18*a* on the guide pipe 15 into the joint 17, the position of the guide pipe 15 is also temporarily fixed to the joint 17. With such temporary fixing, then, the fastening ring 18*b* is loosened. Since the seal pipe 16 is made of material such that its inner wall is smooth against the glass capillary 11, the glass capillary 11 can slide in the seal pipe 16 by manipulating the back end of the glass capillary 11. This enables changing the extension d of the fore end of the glass capillary 11 from the metal tube 12.

Since the guide pipe 15 is made of non-conductive material and the manipulating end of the glass capillary 11 is adequately distant from the other end where the high voltage is applied to the metal tube 12, it is possible to change the extension d while the high voltage is being applied to the metal tube 12 and the sample solution is being nebulized. Thus the operator can manipulate the glass capillary 11 to the optimal position where the amount of ions generated reaches its maximum while detecting the amount of ions by the detector of the mass spectrometer. After the position of the glass capillary 11 is so determined, the fastening ring 18*b* is screwed into the joint 17 to fix the position.

Another advantage of the above configuration is that the nebulizing gas does not leak backward owing to the tight fixing by the fastening ring 18*c* of the guide pipe 15 and the nebulizing tube 13.

Obviously, many modifications and variations of the present invention are possible in light of the above teachings. It is therefore to be understood that within the scope of the appended claims, the invention may be practiced other than as specifically described with the knowledge and skill of ordinary artisans in this field.

What is claimed is:

1. An electrospray ionizer for ionizing a sample solution comprising:

a glass capillary for allowing the sample solution to flow out from a fore end of the glass capillary;

a metal tube provided surrounding the fore end of the glass capillary for generating an electric field at around the fore end of the glass capillary;

a first pipe made of a non-conductive material for holding a back end of the metal tube and extending backward;

a second pipe for slidably holding the glass capillary further back along the first pipe; and a joint for connecting the first pipe and the second pipe.

2. The electrospray ionizer according to claim 1, wherein a fastener is provided at the second pipe and the joint for making the second pipe tightly hold the glass capillary after a position of the glass capillary with respect to the metal tube is adjusted and determined.

3. The electrospray ionizer according to claim 2, wherein the fastener is a ring with a thread whose threaded part is divided by generatrix slits.

4. The electrospray ionizer according to claim 3, wherein the metal tube is surrounded by a nebulizing tube in which a nebulizing gas flows.

5. The electrospray ionizer according to claim 4, wherein the nebulizing tube is fixed to the first pipe.

6. The electrospray ionizer according to claim 2, wherein the metal tube is surrounded by a nebulizing tube in which a nebulizing gas flows.

7. The electrospray ionizer according to claim 6, wherein the nebulizing tube is fixed to the first pipe.

8. The electrospray ionizer according to claim 1, wherein the metal tube is surrounded by a nebulizing tube in which a nebulizing gas flows.

9. The electrospray ionizer according to claim 8, wherein the nebulizing tube is fixed to the first pipe.

* * * * *